Jan. 13, 1970     LEROY E. WILSON     3,489,636
APPARATUS FOR FORMING A MULTI-PLY WEB PRODUCT
Filed Jan. 11, 1968     4 Sheets-Sheet 1

Jan. 13, 1970 LEROY E. WILSON 3,489,636
APPARATUS FOR FORMING A MULTI-PLY WEB PRODUCT
Filed Jan. 11, 1968 4 Sheets-Sheet 2
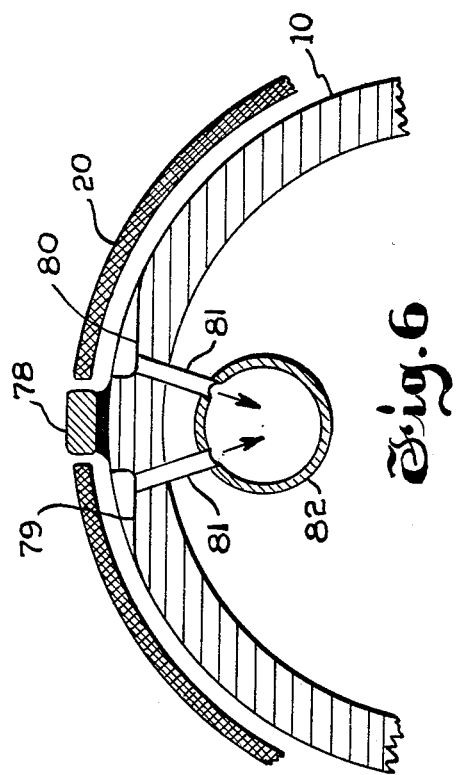
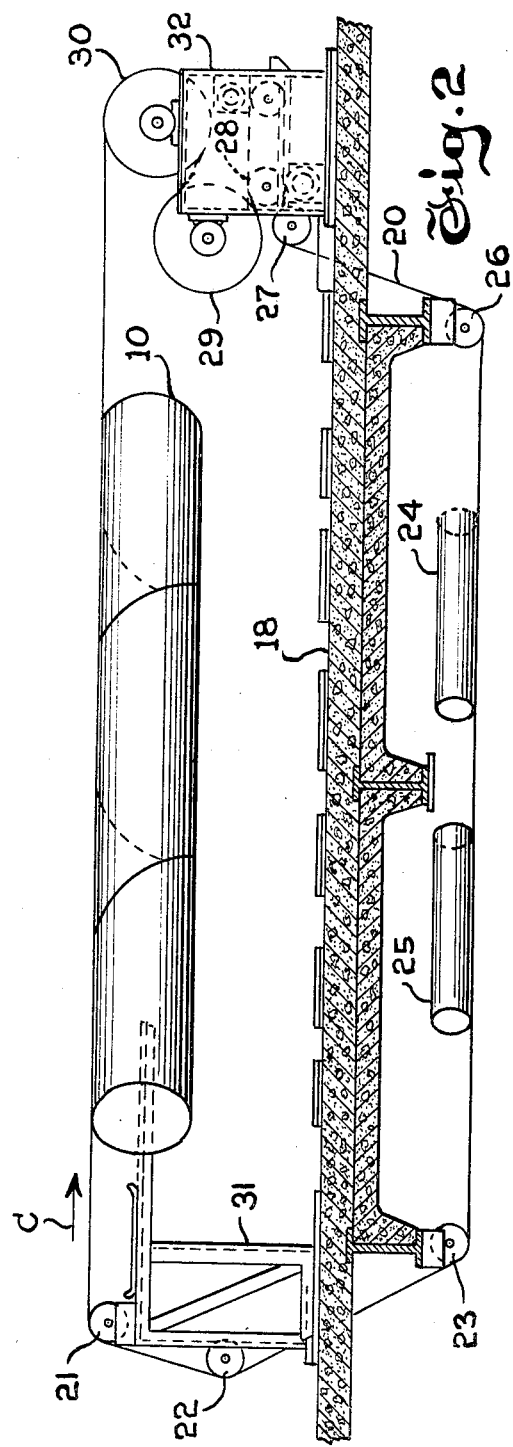

Jan. 13, 1970  LEROY E. WILSON  3,489,636
APPARATUS FOR FORMING A MULTI-PLY WEB PRODUCT
Filed Jan. 11, 1968  4 Sheets-Sheet 4

United States Patent Office 3,489,636
Patented Jan. 13, 1970

3,489,636
APPARATUS FOR FORMING A MULTI-PLY WEB PRODUCT
Leroy E. Wilson, Hendersonville, N.C., assignor to Kimberly-Clark Corporation, Neenah, Wis., a corporation of Delaware
Filed Jan. 11, 1968, Ser. No. 697,190
Int. Cl. B31c 13/00
U.S. Cl. 156—426                               2 Claims

ABSTRACT OF THE DISCLOSURE

An apparatus for making a multi-ply web and having a central mandrel with a belt traveling helically about it on which a web of sheet material is disposed and a carrier rotatably disposed about the mandrel and carrying satellite rolls of web material from which web is wound helically onto the first web. The mandrel has openings through it, and air under pressure is supplied to the interior of the mandrel so that air flows through these openings and floats the belt about the mandrel, and air relief grooves are provided at the edges of the belt on the mandrel so that the air does not flow between the convolutions of the belt to disturb a web crosslaid onto the belt.

---

The invention relates to apparatus for forming a multi-ply web in which the long dimension of one web ply extends transversely across the other web ply.

It has previously been proposed in an application of William H. Burger, Ser. No. 604,705, filed Dec. 27, 1966, to provide an apparatus of this general type in which a belt is spirally traveled around a mandrel with a carrier for one or more satellite rolls of sheet material being disposed to rotate about the mandrel. A first web of sheet material travels longitudinally with the belt as the belt travels about the mandrel, and a web of sheet material from each satellite roll carried by the carrier is wound onto this sheet material carried by the belt as the carrier rotates about the mandrel so as to position sheet material web transversely of the web carried by the belt. The web from the satellite roll or rolls is slit along the edge of the belt after being so wound thereon so as to provide segments of transversely extending web on the outer surface of the first web in direct contact with the belt. The mandrel preferably is provided with openings through its periphery and air under pressure is supplied to the interior of the mandrel for floating the belt on the mandrel.

It is an object of the present invention to so construct the mandrel that air so supplied to the mandrel is prevented from flowing between the convolutions of the belt so as not to disturb the webs from satellite rolls crosslaid onto the belt and onto the web carried thereby as the carrier rotates.

In a preferred form of the invention, a pair of air relief grooves, connected with atmosphere, are provided along the adjacent edges of the belt convolutions, so that the air floating the belt may pass into these relief grooves rather than outwardly between the belt convolutions.

The invention consists of the novel constructions, arrangements and devices to be hereinafter described and claimed for carrying out the above stated objects, and such other objects, as will be apparent from the following description of a preferred form of the invention, illustrated with reference to the accompanying drawings, wherein:

FIG. 2 is a side elevational view of the crosslaying apparatus;

FIG. 6 is a fragmentary sectional view of the center mandrel of the apparatus taken on line 6—6 of FIG. 3.

Like characters of reference designate like parts in the several views.

Figure 1:
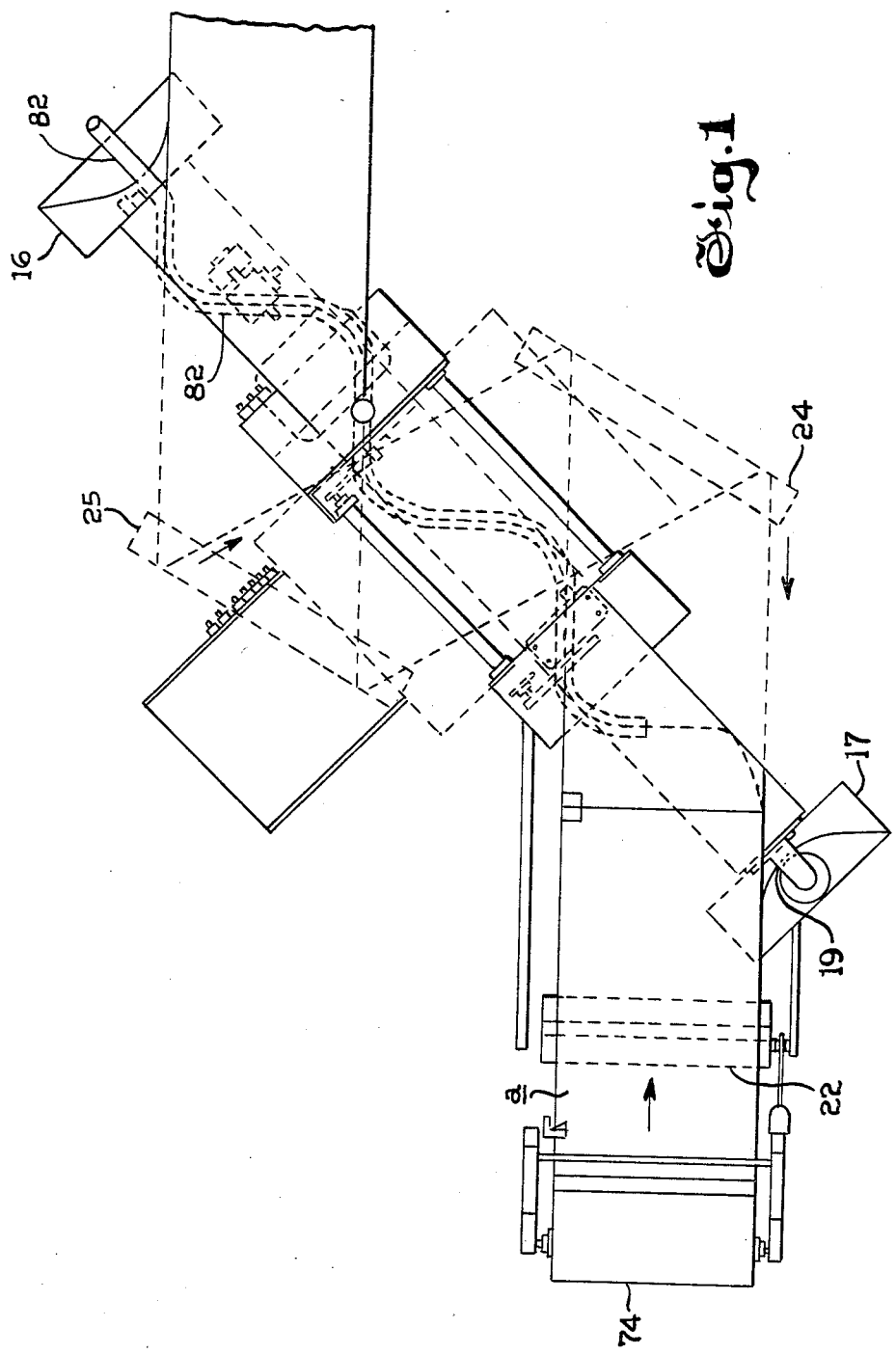
FIG. 1 is a plan view of the crosslaying apparatus embodying the principles of the invention.
Figure 3:
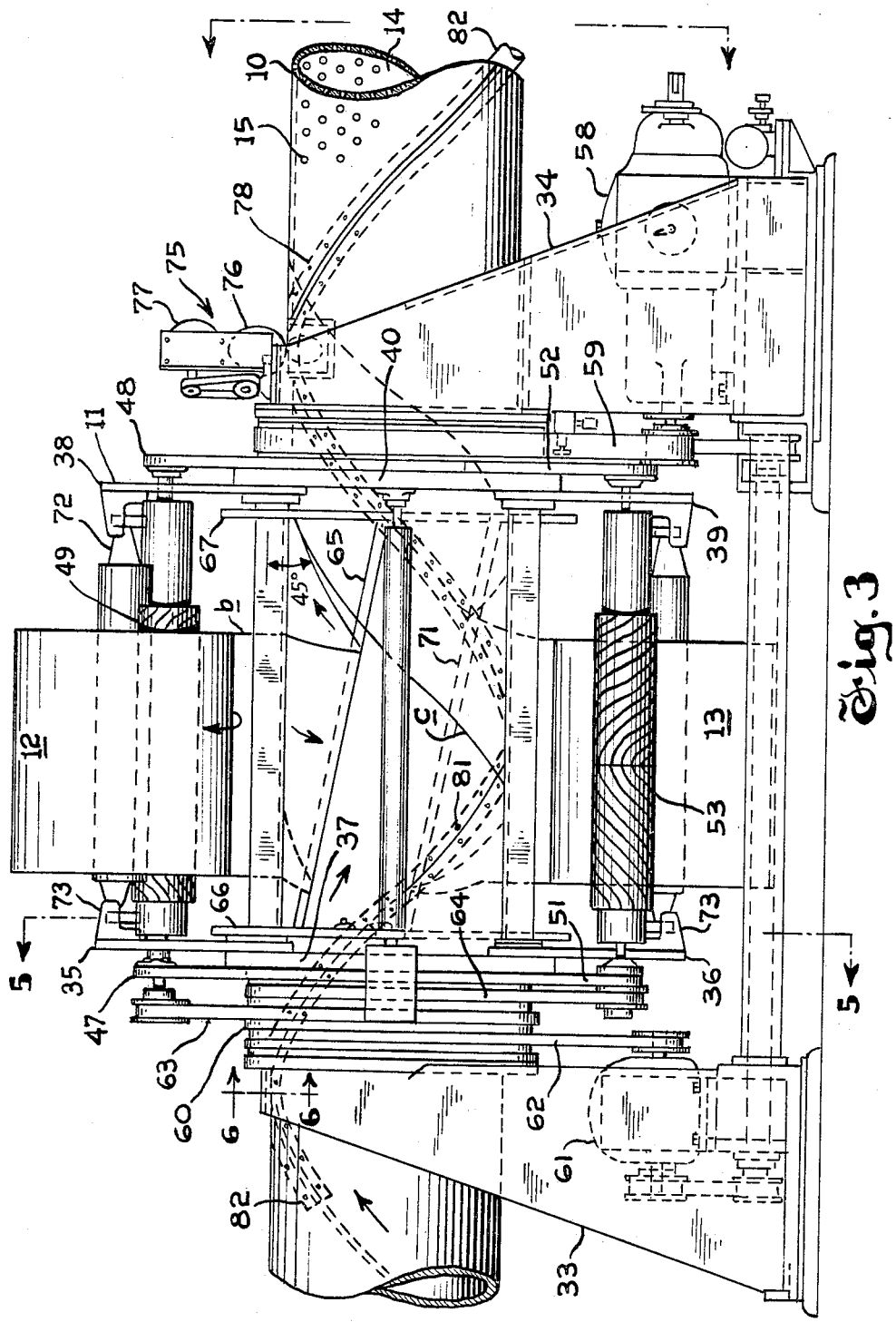
FIG. 3 is a side elevational view on an enlarged scale showing a portion of the crosslaying apparatus in greater detail.

Referring now to the drawings, the illustrated crosslaying apparatus comprises generally a central mandrel 10 and a spider or cage 11 rotatably disposed about the mandrel and carrying a pair of satellite rolls 12 and 13 of sheet material.

The mandrel 10 is in the form of a hollow cylindrical shell with an internal cavity 14 therein and with a plurality of air discharge openings 15 through the mandrel. The mandrel 10 is closed on its opposite ends and is fixed on its ends in standards 16 and 17 resting and fixed on a floor 18. A conduit 19 is connected through the standard 17 with the interior of the mandrel 10 and is supplied with air under pressure.

An endless belt 20 is helically wound about the mandrel 10; and the belt extends over rolls 21, 22 and 23, stationary mandrels 24 and 25 and rolls 26, 27, 28, 29 and 30. The rolls 21 and 22 are rotatably disposed in a framework 31; the rolls 23 and 26 are rotatably disposed attached to floor beams; and the rolls 27, 28, 29 and 30 are rotatably disposed in a framework 32. The rolls 29 and 30 are driven from any suitable prime mover (not shown) for the purpose of driving the belt 20 about the rolls, and the roll 28 is preferably mounted within the framework 32 so as to be adjustable within the framework for the purpose of tightening the belt 20, as desired. The stationary mandrels 24 and 25 are disposed on the underside of the floor 18 by any suitable supporting structure.

The spider 11 is disposed about the mandrel 10 and is rotatably carried by means of a pair of standards 33 and 34 resting on and fixed to the floor 18 so that the spider 11 may rotate about the fixed mandrel 10. The spider 11 comprises a pair of outwardly extending arms 35 and 36 which are fixed with respect to an outer bearing shell 37 and a pair of outwardly extending arms 38 and 39 which are fixed with respect to an outer bearing shell 40. Six connecting rods 41–46 in the form of pipes extend between the arms 35 and 36 and shell 37 on one side and arms 38 and 39 and shell 40 on the other side so as to, in effect, form a unitary spider 11.

A pair of arms 47 and 48 are rotatably mounted with respect to the bearing shells 37 and 40. A roller 49 having a herringbone pattern cut in its external surface extends between and is rotatably disposed with respect to the arms 47 and 48. A connecting rod 50 in the form of a pipe is fixed between and with respect to the arms 47 and 48 so that the arms swing together.

A pair of arms 51 and 52, which are similar to the arms 47 and 48, are also rotatably disposed with respect to the bearing shells 37 and 40; and the arms 51 and 52 carry a roll 53 between them. The roll 53 is similar to the roll 49 and has a herringbone pattern cut into its external surface and is rotatably disposed with respect to the arms 51 and 52. The arms 51 and 52 are also rigidly connected together with respect to each other by means of a connecting rod 54.

The arm 47 is articulated, being made up of arm portions 47a and 47b. The arm portion 47b is swingably mounted on the rod 50 and is moved along with the arm portion 47a toward the adjacent satellite roll 12 by means of an air cylinder 55 which is fixed on the adjacent arm 35. A bell crank 56 is swingably mounted with respect to the arm portion 47a. The inner end of the bell crank 56 is connected to the air cylinder 55, and the other end of the bell crank has a pin and slot connection 57 with the arm portion 47b.

Figure 5:
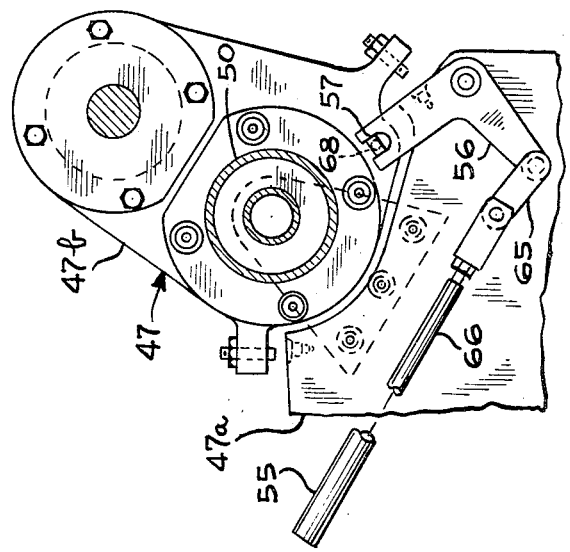
FIG. 5 is a fragmentary view taken on line 5—5 of FIG. 3.
Figure 4:
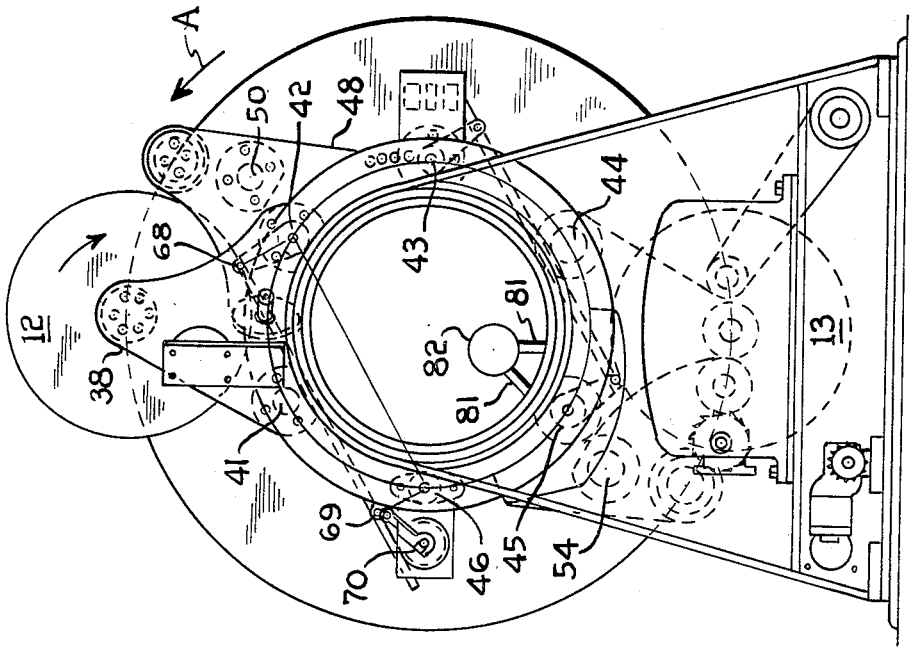
FIG. 4 is an end view of the crosslaying apparatus taken from line 4—4 of FIG. 3.

The opposite arm 48 is articulated in the same manner as the arm 47 and is controlled by a similar air cylinder. The arrangement is such that when the air cylinders for the articulated arms 47 and 48 are energized they turn the bell cranks 56 so that the arm portion 47b and the similar arm portion of the arm 48 rotate counterclockwise, as seen in FIGS. 4 and 5, and the arm portions 47a and corresponding arm portion of the arm 48 also rotate in this direction about the rod 50 so as to move the herringbone roll 49 toward and into forceful contact with the adjacent satellite roll 12.

The two arms 51 and 52 for the herringbone roll 53 are articulated and are controlled by air cylinders 55 similarly as are the arms 47 and 48 just described. The herringbone roll 53 may thus be moved toward the satellite roll 13 in the same manner as the herringbone roll 49 is moved toward the satellite roll 12, as just described.

The spider 11 is driven from a power drive unit 58 by means of a belt 59. The power drive unit 58 is driven from the same prime mover (not shown) that drives the rolls 29 and 30 for the belt 20 so that the movements of the belt 20 and the spider 11 are synchronized or are in timed relationship. The herringbone rolls 49 and 53 are driven from an outer bearing shell 60 which is rotatably disposed with respect to the standard 33. The shell 60 is driven from a prime mover 61 which is synchronized with the prime mover previously mentioned, with a belt 62 extending between the prime mover 61 and the bearing shell 60. Belts 63 and 64 drivingly connect the herringbone rolls 49 and 53 with the shell 60.

A sheet guide bar 65 is mounted diagonally between two support bars 66 and 67. Bars 66 and 67 are each pivoted on the end of a lever 68 which is rotatably disposed on the rod 42. The bars 66 and 67 are also pivotally mounted on levers 69 that are fixed to the rod 46, and the rod 46 is rotatably mounted with respect to the rest of the spider 11. A motor unit 70 is connected to one of the levers 69 for thereby oscillating the two levers 69 and the rod 46, together with the bars 65, 66 and 67. A diagonally extending guide bar 71 is provided opposite the bar 65, and the bar 71 is mounted substantially in the same manner as the bar 65 except that no motor unit 70 is provided, and the guide bar 71 is fixed with respect to the remainder of the spider 11.

The plane defined by the bars 65, 66 and 67 is located very close to and parallel to the periphery of the belt 20, and the same is true of the plane defined by the bar 71 and its supporting bars. The two sheet guide bars 65 and 71 are thus located in planes which extend parallel to the axis of the mandrel 10. The guide bar 71 is fixed with respect to the rest of the spider 11; however, the guide bar 65 is movable to a slight extent in the plane defined by the bars 65, 66 and 67 as the motor unit 70 is energized.

Each of the satellite rolls 12 and 13 is mounted on a central core 72, and the ends of each core fit in saddles 73 carried respectively on the arms 35, 36, 38 and 39. Any suitable mechanism may be provided for holding the cores 72 within the saddles 73 so that the axis of the roll 12 is fixed with respect to the arms 35 and 38 and the axis of the roll 13 is fixed with respect to the arms 36 and 39.

The belt 20 carries a web a of sheet material, and the web a is derived from a roll 74 of sheet material suitably mounted with respect to the floor 18. Sheet material webs b and c are drawn respectively from the satellite supply rolls 12 and 13 so as to be crosslayed with respect to the web a. The webs b and c from the rolls 12 and 13 are slit at edges of the web a so as to provide segments of the webs b and c lying generally across the web a, and a slitter 75 is provided for this purpose. The slitter 75 comprises a slitter wheel 76 rotatably driven by means of a motor 77.

A belt guide bar 78 extends spirally about the mandrel 10 between the convolutions of the belt 20 for the purpose of holding the belt in proper spiral position on the mandrel 10. The belt guide 78 may be fixed on the exterior surface of the mandrel 10 by any suitable means, such as by welding.

The exterior cylindrical surface of the mandrel 10 is recessed to have a pair of air relief grooves 79 and 80 extending spirally about the mandrel 10 and disposed on opposite sides of the guide bar 78 beneath the edges of the belt 20 (see FIG. 6). The grooves 79 and 80 are connected by means of passages 81 with a spiral duct 82 within the mandrel 10 and which is connected to atmosphere through the standard 16 (see FIG. 1).

In operation, the belt 20 is driven in the direction indicated by the arrow C in FIG. 2 about its supporting rolls 21 to 30. The mandrel 10 is supplied with air under pressure from the conduit 19, and the air blown through the openings 15 floats the belt 20 about the mandrel 10. The belt 20 thus moves helically about the mandrel 10 from the roll 21 to the roll 30.

The web a is drawn off the web supply roll 74 onto the belt 20 as the belt passes over the roll 21, and the web a thus travels with the belt helically about the mandrel 10. Segments of the webs b and c are positioned across the web a as will be hereinafter described, and the web a, with these transversely extending web segments, leaves the belt 20 at the roll 30 and travels to any suitable mechanism (not shown) for fixing the segments of the webs b and c onto the longitudinally extending web a. The webs a, b and c may, for example, have thermoplastic material in them, and this mechanism for fixing the segments of the webs b and c onto the web a may, for example, comprise heated rolls over which the webs travel so as to bond the segments of the webs b and c onto the web a due to the heat.

The spider 11 is rotated in the direction indicated by the arrows A. The drive for the spider 11 is from the power drive unit 58 and is through the belt 59. The web b is unwound from the satellite roll 12 with this rotation of the spider 11 and travels from the roll 12 over the guide bar 65 and onto the web a carried by the belt 20 passing over the mandrel 10. The web c unwinds from the satellite roll 13 as the spider 11 rotates about the mandrel 10, and the web c passes over the guide bar 71 onto the web a disposed on the surface of the belt 20. The width of the satellite rolls 12 and 13 and of the webs b and c and the other constants of the system are such that the complete outer surface of the web a is covered by the webs b and c; and the webs b and c overlap slightly and have their longitudinal dimensions extending at an angle, such as 90°, with respect to the longitudinal dimension of the web a.

The slitter 75 is so positioned that the slitter wheel 76 is effective to cut the webs b and c between the convolutions of the belt 20 extending spirally about the mandrel 10, and the bar 78 is preferably discontinuous beneath the slitter wheel 76. The web a thus leaves the mandrel 10 positioned on the belt 20 with segments of the web b and c extending transversely across the web a and overlapping to a slight extent.

The tension with which the webs b and c are wound onto the web a traveling with the belt 21 helically about the mandrel 10 is controlled by means of the herringbone rolls 49 and 53. The herringbone rolls 49 and 53 are respectively held in contact with the surfaces of the rolls 12 and 13 as the rolls 12 and 13 unwind, and the herringbone rolls 49 and 53 are driven in timed relationship, with respect to movement of the belt 20 over the mandrel 10 and with respect to the rate of rotation of the spider 11. Each of the herringbone rolls 49 and 50 is moved by means of air cylinders 55 to keep it into engagement with the surface of the associated satellite roll 12 or 13 as the rolls 12 and 13 decrease in diameter. The air cylinders 55 for the arms 47, 48, 51 and 52 are effective through bell cranks 56 for relatively moving the arm portion 47b and the corresponding arm portions of the other arms 48, 51 and 52.

The amount of overlap of the webs b and c as these webs are wound on the web a traveling along with the belt 20 may be controlled by adjusting the sheet guide bar 65, and the motor unit 70 may be actuated in order to so adjust the bar 65. The levers 68 and 69 pivot as the bars 65, 66 and 67 are moved by the motor unit 70.

The air that is discharged through the openings 15, as above described, floats the belt 20 over the surface of the mandrel 10 as the belt 20 moves helically about the mandrel 10 from the roll 21 to the roll 30. The air that is so discharged through the openings 15 is received by the grooves 79 and 80 and passes inwardly through the passages 81 and through the duct 82 to atmosphere. The grooves 79 and 80 thus prevent the discharge outwardly of air from the openings 15 between the convolutions of the belt 20 and about the sides of the belt guide 78. The grooves 79 and 80 thus advantageously prevent any tendency of air discharged between the convolutions of the belt 20 to disturb and to wrinkle the webs b and c wound onto the surface of the web a supported by the belt 20.

What is claimed is:
1. An apparatus for forming a continuous web product comprising a mandrel, a flexible endless belt helically disposed about said mandrel for carrying a first elongate flexible web longitudinally disposed on the belt, driving means for the belt for moving the belt about the mandrel, a rotatable carrier disposed about said mandrel, means for mounting a supply roll of a second elongate flexible web on said carrier, driving means for drivingly rotating said carrier so that the second web may be applied in the form of a helix about said mandrel as the carrier rotates in such relationship that the long dimension of said second web is maintained at a substantial angle to the long dimension of said first web, said mandrel being provided with a pattern of openings through the mandrel, a source of air under pressure connected to the interior of said mandrel so that air discharges through said openings and floats the belt on the surface of the mandrel, said mandrel being provided with a pair of grooves in its exterior surface extending spirally about the surface of the mandrel and substantially in register with the two opposite edges of the belt in the spiral condition of the belt about the mandrel, a conduit extending through said mandrel and connected to atmosphere, and passage means connecting said conduit and said grooves for receiving the air discharged through said openings so that substantially none of the air so discharged travels outwardly between the convolutions of said belt for maintaining said second web crossing the edges of the belt undisturbed.

2. An apparatus for forming a continuous web product as set forth in claim 1, and a guide bar for guiding said belt and disposed helically about said mandrel on its exterior surface between the convolutions of said belt on the mandrel and between said spiral grooves on the exterior surface of the mandrel.

References Cited

UNITED STATES PATENTS

| | | | |
|---|---|---|---|
| 1,544,546 | 7/1925 | Baker | 156—425 |
| 2,696,244 | 12/1954 | Jackson | 156—439 XR |

BENJAMIN A. BORCHELT, Primary Examiner

T. H. WEBB, Assistant Examiner

U.S. Cl. X.R.

156—289